(12) United States Patent
Chon et al.

(10) Patent No.: US 12,289,596 B2
(45) Date of Patent: Apr. 29, 2025

(54) BENDABLE DISPLAY DEVICE AND METHOD FOR CONTROLLING THE SAME

(71) Applicant: LG ELECTRONICS INC., Seoul (KR)

(72) Inventors: Hayoung Chon, Seoul (KR); Sangkeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 17/976,272

(22) Filed: Oct. 28, 2022

(65) Prior Publication Data

US 2023/0179948 A1 Jun. 8, 2023

(30) Foreign Application Priority Data

Dec. 7, 2021 (WO) ................ PCT/KR2021/018440

(51) Int. Cl.
| | | |
|---|---|---|
| H04S 7/00 | (2006.01) | |
| A63F 13/54 | (2014.01) | |
| H04R 1/02 | (2006.01) | |
| H04R 17/00 | (2006.01) | |

(52) U.S. Cl.
CPC .............. H04S 7/307 (2013.01); A63F 13/54 (2014.09); H04R 1/028 (2013.01); *A63F 2300/6081* (2013.01); *H04R 17/00* (2013.01); *H04R 2499/15* (2013.01); *H04S 2400/11* (2013.01); *H04S 2400/13* (2013.01)

(58) Field of Classification Search
CPC ...... H04S 7/307; H04S 2400/13; A63F 13/54; A63F 2300/6081; H04R 1/028; H04R 2900/11; H04R 7/04; H04R 5/02; H04R 2201/025; H04F 17/00
USPC ......................................................... 381/306
See application file for complete search history.

(56) References Cited

U.S. PATENT DOCUMENTS

| | | | |
|---|---|---|---|
| 6,285,770 B1 * | 9/2001 | Azima | ................ B60R 11/0217 |
| | | | 381/388 |
| 2013/0215041 A1 | 8/2013 | Kim et al. | |
| 2016/0117962 A1 | 4/2016 | Jung et al. | |
| 2016/0150342 A1 | 5/2016 | Choi et al. | |

(Continued)

FOREIGN PATENT DOCUMENTS

| | | |
|---|---|---|
| JP | 2008-294493 | 12/2008 |
| KR | 1020150043935 | 4/2015 |
| KR | 102127926 | 6/2020 |

(Continued)

OTHER PUBLICATIONS

PCT International Application No. PCT/KR2021/018440, International Search Report dated Aug. 26, 2022, 9 pages.

(Continued)

*Primary Examiner* — Sean H Nguyen
(74) *Attorney, Agent, or Firm* — LEE, HONG, DEGERMAN, KANG & WAIMEY

(57) ABSTRACT

The present disclosure relates to a bendable display. For example, the bendable display device stores first information about a size of a screen of the bendable display device in a memory, outputs video data and audio data of content via the screen, receive second information about a curvature of the screen, and output the audio data adjusted based on the first information and the second information via the screen.

10 Claims, 15 Drawing Sheets

(56) References Cited

U.S. PATENT DOCUMENTS

2020/0097086 A1* 3/2020 Bushnell ................ H10N 30/20
2022/0201401 A1* 6/2022 Ko ....................... H04R 17/005

FOREIGN PATENT DOCUMENTS

KR     1020210056094     5/2021
KR       102320359     11/2021

OTHER PUBLICATIONS

Park, "CSO (Cinematic Sound OLED)", Korean Association, pp. 40-46, Oct. 2021, 10 pages.
European Patent Office Application Serial No. 21967313.4, Search Report dated Dec. 16, 2024, 10 pages.
Wayne Karrfall, "How to Achieve Perfect iTunes Equalizer Settings for Your Music", Nov. 9, 2004, 7 pages.

\* cited by examiner (a)

(b)

(b)

(a)

(a)  (b)

(a)

(a)

BENDABLE DISPLAY DEVICE AND METHOD FOR CONTROLLING THE SAME

CROSS-REFERENCE TO RELATED APPLICATIONS

Pursuant to 35 U.S.C. § 119, this application claims the benefit of an earlier filing date and right of priority to International Application No. PCT/KR2021/018440, filed on Dec. 7, 2021, the contents of which are hereby incorporated by reference herein its entirety.

BACKGROUND

Field

The present disclosure relates to a display device that may be changed into a curved structure that may improve immersion of a user. The present disclosure may be applied to a bendable display technology of various products such as a TV.

Discussion of the Related Art

With the increasing development of information society, the demand for display devices is also increasing in various forms. In response to this trend, various display devices, for example, Liquid Crystal Display (LCD), Field Emission Display (FED), Plasma Display Panel (PDP), an electroluminescent device, etc. have recently been developed.

A liquid crystal panel of the LCD may include a liquid crystal layer, may further include a thin film transistor (TFT) substrate and a color filter substrate that are arranged to face each other on the basis of the liquid crystal panel interposed therebetween, and may display an image using light provided from a backlight unit.

As an example of an electroluminescent device, active-matrix-type organic light emitting display (OLED) devices are commercially available on the market and widely used throughout the world. Since the OLED device is a self-emitting device, the OLED device has no backlight and is advantageous in terms of a response speed and a viewing angle as compared to the LCD, so that the OLED devices are attracting attention as next-generation displays.

Furthermore, recently, without a speaker, for example, a cinematic sound OLED (CSO) in which a TV screen produces sound like a diaphragm has been commercialized. In one example, such a technology is also referred to as a display speaker or a surface sound display. In order to implement the same, for example, a piezo (piezoelectric) vibration sensor is added. The corresponding sensor has a structure in which, as the sensor repeats expansion and compression when power flows therethrough, vibration is transmitted to an OLED panel in contact with the sensor. The piezo vibration sensor, for example, has an advantage of using less power and having a loud sound.

However, when the piezo vibration sensor capable of outputting audio via the screen as described above is disposed on the screen and the corresponding screen has a bendable structure, following problems occur.

First, there is a problem in that, for the same content, an effect of the audio perceived by a user varies based on a degree of bending of the display.

Second, according to the prior art, a technology for automatically modulating the audio differently depending on the content and the degree of bending of the bendable display is not applied.

SUMMARY

One embodiment of the present disclosure is to provide the same acoustic effect to a user regardless of a degree of bending of a display for the same content.

Another embodiment of the present disclosure is to provide a technology for automatically modulating audio differently depending on a type of content and a degree of bending of a bendable display.

A method for controlling a bendable display device according to one embodiment of the present disclosure includes storing first information about a size of a screen of the bendable display device in a memory, outputting video data and audio data of content via the screen, receiving second information about a curvature of the screen, and outputting the audio data adjusted based on the first information and the second information via the screen.

A method for controlling a bendable display device according to another embodiment of the present disclosure includes outputting video data and audio data of content via a screen of the bendable display device, determining a type of the content, determining a bending level of the screen, and restrictively adjusting a certain frequency range of the audio data based on the determined content type and bending level.

According to one embodiment of the present disclosure, the same acoustic effect is provided to the user regardless of the degree of bending of the display for the same content.

According to another embodiment of the present disclosure, the audio is automatically modulated differently to better meet needs of the user depending on the type of content and the degree of bending of the bendable display.

The effects that may be obtained from the present disclosure are not limited to the effects mentioned above, and other effects not mentioned may be clearly understood by those with ordinary skill in the technical field to which the present disclosure belongs from the description below.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

In addition.

DESCRIPTION OF SPECIFIC EMBODIMENTS

Figure 1:
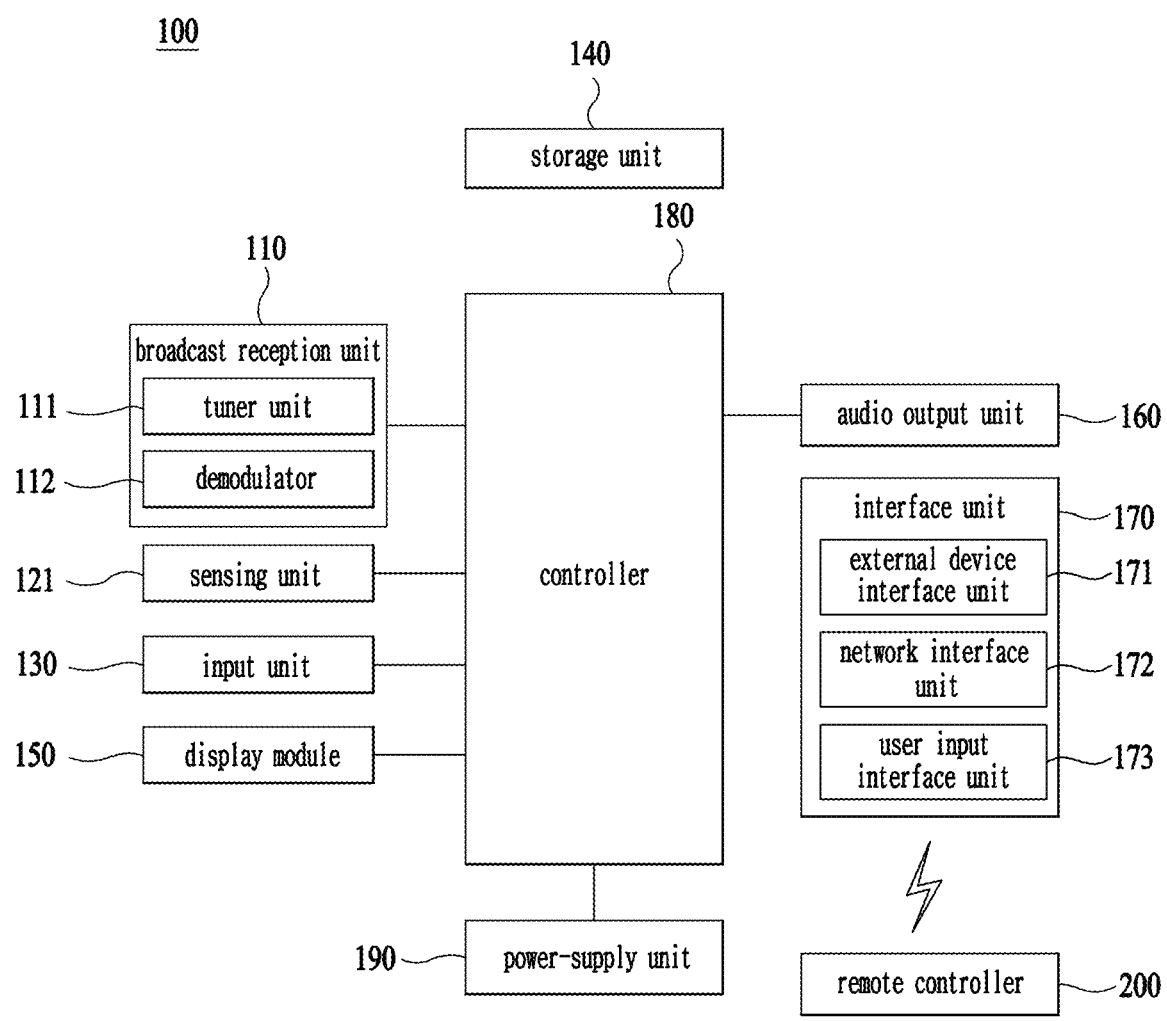
FIG. 1 is a block diagram illustrating constituent elements of a display device according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

On the other hand, the image display device described herein is, for example, an intelligent image display device implemented by adding a computer support function to a broadcast reception function, and further includes an Internet function or the like while sufficiently performing the broadcast reception function, so that the image display device may have user-friendly interfaces such as a handwriting input device, a touchscreen, or a spatial remote controller. Further, the image display device can support a wired or wireless Internet function by connecting to the Internet and a computer device, thereby performing e-mailing, web browsing, banking, or gaming. To implement these functions, the image display device may operate based on a standard general-purpose Operating System (OS).

Accordingly, the image display device according to the present disclosure is designed in a manner that various applications can be easily added to or deleted from a general-purpose OS kernel so that the image display device can perform various user-friendly functions. The image display device may be, for example, a network TV, a Hybrid broadcast broadband TV (HBBTV), a smart TV, etc. The image display device is applicable to a smartphone as needed.

FIG. 1 is a block diagram illustrating constituent elements of a display device 100 according to an embodiment of the present disclosure.

Referring to FIG. 1, the display device 100 may include a broadcast reception unit 110, an external device interface unit 171, a network interface unit 172, a storage unit 140, a user input interface unit 173, an input unit 130, a controller 180, a display 150, an audio output unit 160, and/or a power-supply unit 190.

The broadcast reception unit 110 may include a tuner unit 111 and a demodulator 112.

Although not shown in the drawings, the display device 100 may include only the external device interface unit 171 and the network interface unit 172 from among the broadcast reception unit 110, the external device interface unit 171, and the network interface unit 172. That is, the display device 100 may not include the broadcast reception unit 110.

The tuner unit 111 may select a broadcast signal corresponding to either a user-selected channel or all prestored channels from among broadcast signals received through an antenna (not shown) or a cable (not shown). The tuner unit 111 may convert the selected broadcast signal into an intermediate frequency (IF) signal or a baseband image or a voice signal.

For example, when the selected broadcast signal is a digital broadcast signal, the tuner unit 111 may convert the selected broadcast signal into a digital IF (DIF) signal. When the selected broadcast signal is an analog broadcast signal, the tuner unit 111 may convert the selected broadcast signal into an analog baseband image or a voice signal (CVBS/SIF). That is, the tuner unit 111 may process the digital broadcast signal or the analog broadcast signal. The analog baseband image or the voice signal (CVBS/SIF) output from the tuner unit 111 may be directly input to the controller 180.

The tuner unit 111 may sequentially select broadcasting signals of all broadcasting channels stored through a channel memory function from among the received broadcast signals, and may convert the selected broadcast signal into an intermediate frequency (IF) signal or a baseband image or a voice signal.

The tuner unit 111 may include a plurality of tuners to receive broadcast signals of the plurality of channels. Alternatively, a single tuner for simultaneously receiving broadcast signals of the plurality of channels is also possible.

The demodulator 112 may receive the digital IF signal (DIF) converted by the tuner unit 111, and may thus perform demodulation of the received signal. The demodulator 112 may perform demodulation and channel decoding, and may output a stream signal (TS). The stream signal may be a signal formed by multiplexing an image signal, a voice signal, or a data signal.

The stream signal (TS) output from the demodulator 112 may be input to the controller 180. The controller 180 may perform demultiplexing, image/audio signal processing, etc., may output an image through the display 150, and may output a voice through the audio output unit 160.

The sensing unit 120 may sense a change in the display device 100 or may sense an external change. For example, the sensing unit 120 may include a proximity sensor, an illumination sensor, a touch sensor, an infrared (IR) sensor, an ultrasonic sensor, an optical sensor (e.g., a camera), a voice sensor (e.g., a microphone), a battery gauge, environmental sensors (e.g., hygrometer, a thermometer, etc.).

The controller 180 may check a state of the display device 100 based on information collected by the sensing unit 120, may notify the user of a problem, or may control the display device 100 to be kept in the best state.

In addition, it is possible to provide an optimal viewing environment by differently controlling the content, image quality, size, etc. of the image provided to the display module 180 depending on the viewer, ambient illuminance, etc. sensed by the sensing unit. As the smart TV has evolved, the number of functions mounted in the display device increases, and the number of the sensing units 20 also increases together with the increasing functions.

The input unit 130 may be provided at one side of a main body of the display device 100. For example, the input unit 130 may include a touch pad, a physical button, and the like. The input unit 130 may receive various user commands related to the operation of the display device 100, and may transmit a control signal corresponding to the input command to the controller 180.

Recently, as a bezel of the display device 100 decreases in size, the number of display devices 100 each including a minimum number of input unit 130 formed in a physical button exposed to the outside is rapidly increasing. Instead, a minimum number of physical buttons may be provided on the back or side surface of the display device 100. The display device may receive a user input through the remote controller 200 through a touchpad or a user input interface unit 173 to be described later.

The storage unit 140 may store a program for processing and controlling each signal used in the controller 180, and may store a signal-processed image, a voice, or a data signal. For example, the storage unit 140 may store application programs designed for the purpose of performing various tasks that can be processed by the controller 180, and may selectively provide some of the stored application programs upon request of the controller 180.

The program stored in the storage unit 140 is not specifically limited to being executed by the controller 180. The storage unit 140 may perform a function for temporarily storing an image, a voice, or a data signal received from an external device through the external device interface unit 171. The storage unit 140 may store information about a predetermined broadcast channel through a channel memory function such as a channel map.

Although the storage unit 140 of FIG. 1 is provided separately from the controller 180, the scope of the present disclosure is not limited thereto, and the storage unit 140 may also be included in the controller 180 as needed.

The storage unit 140 may include at least one of a volatile memory (e.g., DRAM, SRAM, SDRAM, etc.) and a non-volatile memory (e.g., flash memory, hard disk drive (HDD), solid state drive (SSD), etc.).

The display 150 may generate a drive signal by converting an image signal, a data signal, an OSD signal, a control signal processed by the controller 180, or by converting an image signal, a data signal, a control signal, etc. received from the interface unit 171. The display 150 may include a display panel 181 having a plurality of pixels.

A plurality of pixels included in the display panel may include RGB sub-pixels. Alternatively, a plurality of pixels included in the display panel may include sub-pixels of RGBW. The display 150 may convert the image signal, the data signal, the OSD signal, the control signal, etc. processed by the controller 180 to generate a drive signal for the plurality of pixels.

The display 150 may be implemented as a plasma display panel (PDP), a liquid crystal display (LCD), an organic light emitting diode (OLED), a flexible display, etc. In addition, the display 150 may also be implemented as a three-dimensional (3D) display. The three-dimensional (3D) display 150 may be classified into a glassless-type 3D display and a glasses-type 3D display.

The display device may include a display module that occupies most parts of the front surface, and a case that covers the back and side surfaces of the display module and packages the display module.

Recently, the display device 100 has evolved from a flat-screen display to a curved-screen display. In order to implement the curved screen, the display device 100 may use a display module 150 that can be bent or curved, such as a light emitting diode (LED) or an organic light emitting diode (OLED), etc.

Conventionally, the LCD has difficulty in self-emitting light, so that the conventional LCD has been designed to receive light through a backlight unit. The backlight unit is a device for uniformly supplying light received from a light source to a liquid crystal located on the front surface of the display device. As the backlight becomes thinner, a thin LCD can be implemented. However, it is actually difficult for the backlight unit to be implemented as a curved structure formed of a flexible material. Although the backlight unit is implemented as a curved shape, it is difficult for light to be uniformly applied to the liquid crystal, thereby changing brightness of the screen.

On the other hand, the LED or the OLED is designed in a manner that each of constituent elements constructing the pixels can self-emit light without using the backlight unit, so that the LED or the OLED can be implemented as a curved shape without any problems. In addition, since each element can perform self-emission of light, brightness of each element is not affected by a change in the positional relationship between the element and adjacent elements, so that a curved display module 150 can be implemented as an LED or OLED.

OLED (Organic Light Emitting Diode) panels appeared in earnest in mid-2010 and are rapidly replacing LCDs in the small- and medium-sized display market. The OLED is a display made using the self-emission characteristics in which OLED emits light when a current flows in a fluorescent organic compound. Since the response speed of the OLED is faster than that of the LCD, there is little afterimage when moving images are implemented.

OLEDs may be used as a light-emitting display product. In this case, the light-emitting display device may use three fluorescent organic compounds (such as red, green, and blue) each having a self-emitting function, and may use the self-emitting phenomenon in which positive(+)-charged particles and electrons injected from a cathode and anode are combined with each other within the organic material, so that a backlight unit causing degradation of color sense need not be used.

The LED panel is implemented by technology for using only one LED element as one pixel, and has a smaller LED element compared to the prior art, so that a curved display module 150 can be implemented. Whereas the conventional device referred to as an LED TV can use the LED as a light source of the backlight unit for supplying light to the LCD, it is impossible for the LED of the conventional device to constitute a screen.

The display module may include a display panel, a coupling magnet located on the rear surface of the display panel, a first power-supply unit, and a first signal module. The display panel may include a plurality of pixels (R, G, B). The plurality of pixels (R, G, B) may be formed in each region where a plurality of data lines and a plurality of gate lines cross each other. The plurality of pixels (R, G, B) may be arranged in a matrix.

For example, the plurality of pixels (R, G, B) may include a red (R) sub-pixel, a green (G) sub-pixel, and a blue (B) sub-pixel. The plurality of pixels (R, G, B) may further include white (W) sub-pixel(s).

In the display module 150, one side where an image is displayed may be referred to as a front side or a front surface. When the display module 150 displays an image, one side where no image is observed may be referred to as a rear side or a rear surface.

Meanwhile, the display 150 may be implemented as a touchscreen, so that the display 150 can also be used as an input device in addition to an output device.

The audio output unit 160 may receive a voice-processed signal from the controller 180, and may output the received signal as a voice signal.

The interface unit 170 may serve as a path of connection to various kinds of external devices connected to the display device 100. The interface unit may include not only a wired method for transmitting/receiving data through a cable, but also a wireless method using the antenna.

The interface unit 170 may include at least one of a wired/wireless headset port, an external charger port, a wired/wireless data port, a memory card port, a port connected to a device having an identification module, an audio input/output (I/O) port, a video I/O port, and an earphone port.

As an example of a wireless method, the above-described broadcast reception unit 110 may be used. The broadcast reception unit 110 may be configured to use a broadcast signal, a mobile communication short-range communication signal, a wireless Internet signal, and the like.

The external device interface unit 171 may transmit or receive data to and from a connected external device. To this end, the external device interface unit 171 may include an A/V input/output (I/O) unit (not shown).

The external device interface unit 171 may be wired or wirelessly connected to an external device such as a digital versatile disc (DVD) player, a Blu-ray player, a game console, a camera, a camcorder, a computer (laptop), a set-top box, or the like, and may perform an input/output (I/O) operation with the external device.

In addition, the external device interface unit 171 may establish a communication network with various remote controllers 200, may receive a control signal related to operation of the display device 100 from the remote controller 200, or may transmit data related to operation of the display device 100 to the remote controller 200.

The external device interface unit 171 may include a wireless communication unit (not shown) for short-range wireless communication with other electronic devices. Through the wireless communication unit (not shown), the external device interface unit 171 may exchange data with an adjacent mobile terminal. In particular, the external device interface unit 171 may receive device information, application information, an application image, and the like from the mobile terminal in a mirroring mode.

The network interface unit 172 may provide an interface for connecting the display device 100 to a wired/wireless network including the Internet network. For example, the network interface unit 172 may receive content or data provided by the Internet, a content provider, or a network administrator through a network. The network interface unit 172 may include a communication module (not shown) for connection with the wired/wireless network.

The external device interface unit 171 and/or the network interface unit 172 may include a communication module for short-range communication such as Wi-Fi, Bluetooth, Bluetooth low energy (BLE), ZigBee, Near Field Communication (NFC), and a communication module for cellular communication such as Long-Term Evolution (LTE), LTE-A (LTE Advanced), Code Division Multiple Access (CDMA), WCDMA (wideband CDMA), UMTS (universal mobile telecommunications system), WiBro (Wireless Broadband), etc.

The user input interface unit 173 may transmit user input signals to the controller 180, or may transmit signals received from the controller 180 to the user. For example, the user input interface unit 173 may transmit or receive user input signals (such as a power-on/off signal, a channel selection signal, and a screen setting signal) to and from the remote controller 200, may transmit user input signals received through a local key (not shown) such as a power key, a channel key, a volume key, and a setting key to the controller 180, may transmit a user input signal received by a sensor unit (not shown) for sensing a user gesture to the controller 180, or may transmit a signal received from the controller 180 to the sensor unit.

The controller 180 may include at least one processor, and may control the overall operation of the display device 100 using the processor included therein. Here, the processor may be a general processor such as a CPU. Of course, the processor may be a dedicated device such as an ASIC, or other hardware-based processor.

The controller 180 may demultiplex the stream received through the tuner unit 111, the demodulator 112, the external device interface unit 171, or the network interface 172, and may process the demultiplexed signals to generate and output a signal for image or voice output.

The image signal processed by the controller 180 may be input to the display 150 and displayed as an image corresponding to the corresponding image signal. In addition, the image signal processed by the controller 180 may be input to the external output device through the external device interface unit 171.

The voice (or audio) signal processed by the controller 180 may be audibly output to the audio output unit 160. In addition, the voice signal processed by the controller 180 may be input to the external output device through the external device interface unit 171. Although not shown in FIG. 2, the controller 180 may include a demultiplexer, an image processor, and the like, and a detailed description thereof will hereinafter be described with reference to FIG. 3.

In addition, the controller 180 may control the overall operation of the display device 100. For example, the controller 180 may control the tuner unit 111 to select a broadcast program corresponding to either a user-selected channel or a prestored channel.

In addition, the controller 180 may control the display device 100 by a user command or an internal program received through the user input interface unit 173. The controller 180 may control the display 150 to display an image. In this case, the image displayed on the display 150 may be a still image or a moving image, and may be a 2D image or a 3D image.

On the other hand, the controller 180 may display a predetermined 2D object in the image displayed on the display 150. For example, the object may be at least one of a connected web screen (newspaper, magazine, etc.), electronic program guide (EPG), various menus, widgets, icons, still images, moving images, and text.

Meanwhile, the controller 180 may modulate and/or demodulate the signal using an amplitude shift keying (ASK) scheme. Here, the ASK scheme may refer to a method for modulating a signal by differentiating the amplitude of a carrier wave according to data values or for restoring an analog signal to a digital data value according to the amplitude of the carrier wave.

For example, the controller 180 may modulate an image signal using the ASK scheme, and may transmit the modulated signal through a wireless communication module.

For example, the controller 180 may demodulate and process the image signal received through the wireless communication module using the ASK scheme.

Accordingly, the display device 100 may simply transmit and receive signals to and from other image display devices arranged adjacent to each other without using either a unique identifier such as a Media Access Control (MAC) address or a complex communication protocol such as TCP/IP.

On the other hand, the display device 100 may further include a photographing unit (not shown). The photographing unit may photograph a user. The photographing unit may be implemented as one camera, but is not limited thereto, and may be implemented by a plurality of cameras. On the other hand, the photographing unit may be embedded in the display device 100 or may be separately arranged on the display 150. The image information photographed by the photographing unit may be input to the controller 180.

The controller 180 may recognize the position of the user based on the image photographed by the photographing unit. For example, the controller 180 may recognize a distance (z-axis coordinates) between the user and the display device 100. In addition, the controller 180 may recognize the X-axis coordinate and the Y-axis coordinate within the display 150 corresponding to the user position.

The controller 180 may sense a user gesture based on an image photographed by the photographing unit, each of signals detected by the sensor unit, or a combination thereof.

The power-supply unit 190 may supply corresponding power to the display device 100. In particular, the controller 180 may be implemented as a System on Chip (SoC), a display 150 for displaying an image, and an audio output unit 160 for audio output.

Specifically, the power-supply unit 190 may include a converter (not shown) for converting AC power into DC power, and a DC/DC converter (not shown) for converting the level of DC power.

On the other hand, the power-supply unit 190 may receive power from the external power source, and may distribute the received power to the respective components. The power-supply unit 190 may be directly connected to the external power source to supply AC power, and may include a battery capable of being charged with electricity.

In the former case, the power-supply unit 190 may be used by connecting to a wired cable, and it is difficult for the power-supply unit 190 to move from one place to another place, and the movement range of the power-supply unit 190 is limited. In the latter case, the power-supply unit 190 can move from one place to another place, but the weight and volume of the power-supply unit 190 may increase as much as the weight and volume of the battery. In addition, for charging, the power-supply unit 190 should be directly connected to a power cable for a predetermined period of time or should be coupled to a charging cradle (not shown) for power supply.

The charging cradle may be connected to the display device through a terminal exposed to the outside. Alternatively, if the power-supply unit 190 approaches the charging cradle using a wireless interface, a built-in battery of the power-supply unit 190 may also be charged with electricity.

The remote controller 200 may transmit a user input to the user input interface unit 173. To this end, the remote controller 200 may use Bluetooth, Radio Frequency (RF) communication, infrared (IR) communication, Ultra-Wideband (UWB), ZigBee, or the like. In addition, the remote controller 200 may receive the image, voice, or data signal output from the user input interface unit 173, and may display or audibly output the received image, voice, or data signal.

On the other hand, the above-described display device 100 may be a fixed or mobile digital broadcast receiver capable of receiving digital broadcast signals.

Meanwhile, the block diagram of the display device 100 shown in FIG. 1 is disclosed for only for illustrative purposes for one embodiment of the present disclosure, and the respective components of the display device 100 shown in FIG. 1 can be integrated, added or omitted according to the specifications of the digital device 100 which is actually implemented.

That is, if necessary, two or more components may be combined into one component, or one component may be subdivided into two or more components. In addition, the functions performed in each block are intended to explain the embodiment of the present disclosure, and the specific operation or device does not limit the scope of the present disclosure.

Figure 2:
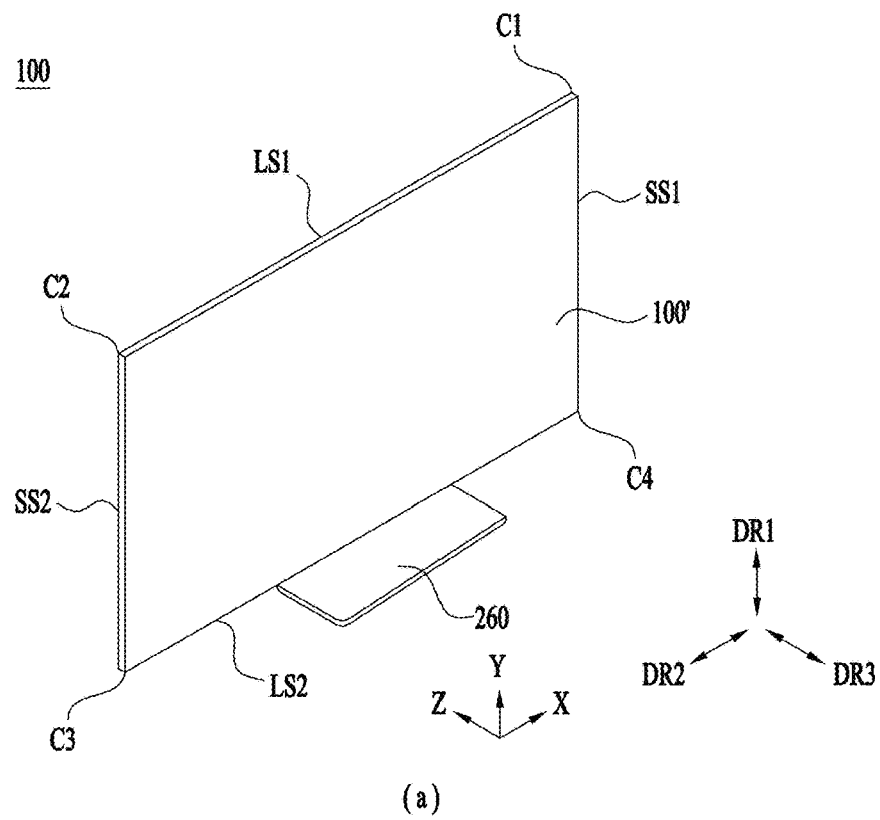
FIG. 2 is a perspective view illustrating an example of a display device according to an embodiment of the present disclosure.
Figure 2:
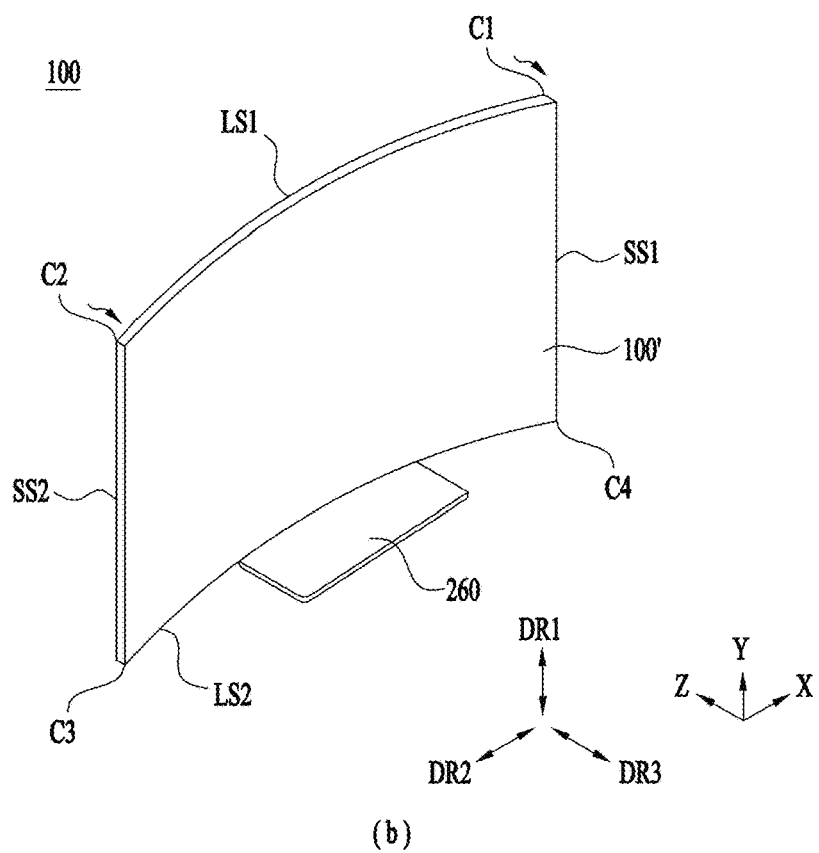

FIG. 2 is a perspective view illustrating an example of the display device according to an embodiment of the present disclosure.

Referring to FIG. 2, the display device 100 may have a rectangular body 100' including a first long side (LS1), a second long side (LS2) facing the first long side (LS1), a first short side (SS1) adjacent to the first long side (LS1) and the second long side (LS2), and a second short side (SS2) facing the first short side (SS1).

Here, the first short side area (SS1) is referred to as a first side area. The second short side area (SS2) is referred to as a second side area facing the first side area. The first long side area (LS1) is referred to as a third side area that is adjacent to the first side area and the second side area while being disposed between the first side area and the second side area. The second long side area (LS2) is referred to as a fourth side area that is adjacent to the first side area and the second side area while being disposed between the first side area and the second side area.

In addition, although the length of the first and second long sides LS1 and LS2 is longer than the length of the first and second short sides SS1 and SS2 as shown in FIG. 2, the scope of the present disclosure is not limited thereto, and the length of the first and second long sides LS1 and LS2 may also be approximately the same as the length of the first and second short sides SS1 and SS2 as needed.

In addition, the first direction (DR1) may be a direction parallel to each of the long sides LS1 and LS2 of the display device 100, and the second direction (DR2) may be a direction parallel to each of the short sides SS1 and SS2 of the display device 100. The third direction (DR3) may be a direction perpendicular to the first direction (DR1) and/or the second direction (DR2).

From another point of view, the side where the display device 100 displays an image may be referred to as a front side or a front surface. When the display device 100 displays an image, the side where no image is observed may be referred to as a back side or a back surface. When the display device 100 is viewed from the front side or the front surface, the first long side (LS1) may be referred to as an upper side or an upper surface. Similarly, the second long side (LS2) may be referred to as a lower side or a lower surface. Similarly, the first short side (SS1) may be referred to as a right side or a right surface, and the second short side (SS2) may be referred to as a left side or a left surface.

In addition, the first long side (LS1), the second long side (LS2), the first short side (SS1), and the second short side (SS2) may be referred to as an edge of the display device 100. A point where the first long side (LS1), the second long side (LS2), the first short side (SS1), and the second short side (SS2) meet each other may be referred to as a corner. For example, a point where the first long side (LS1) and the first short side (SS1) meet each other may be referred to as a first corner (C1). A point where the first long side (LS1) and the second short side (SS2) meet each other may be referred to as a second corner (C2). A point where the second short side (SS2) and the second long side (LS2) meet each other may be referred to as a third corner (C3). A point where the second long side (LS2) and the first short side (SS1) meet each other may be referred to as a fourth corner (C4).

Here, the direction from the first short side (SS1) to the second short side (SS2) or the direction from the second short side (SS2) to the first short side (SS1) may be referred to as a horizontal direction (LR). The direction from the first long side (LS1) to the second long side (LS2) or from the second long side (LS2) to the first long side (LS1) may be referred to as a vertical direction (UD).

The display device 100 according to the present disclosure may change the shape of the display module 150 using the LED or OLED instead of a liquid crystal, as shown in FIG. 2(a) or FIG. 2(b). That is, the backlight unit may be omitted, and the display device can be changed in shape within a predetermined range, so that the curved display device 100 can be implemented as shown in FIG. 2(b) using the above-described characteristics.

The display device 100 according to the present disclosure is a variable display device 100 in which a user can adjust a curvature according to a situation, rather than a curved display device fixed in a curved state. The display device 100 may further include a curvature adjustment unit capable of changing a curvature of the main body 100' configured to include the display module 150.

Figure 3:
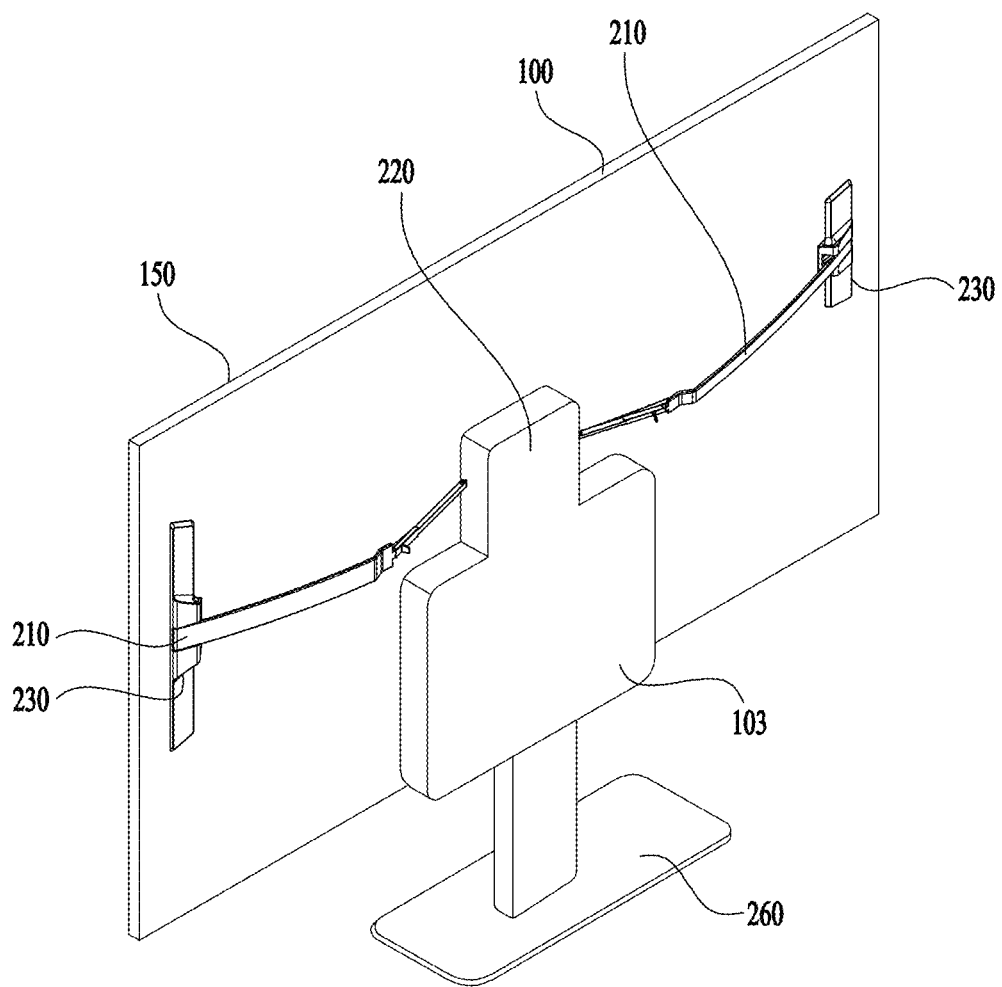
FIG. 3 is a rear view illustrating a display device according to an embodiment of the present disclosure.
Figure 4:
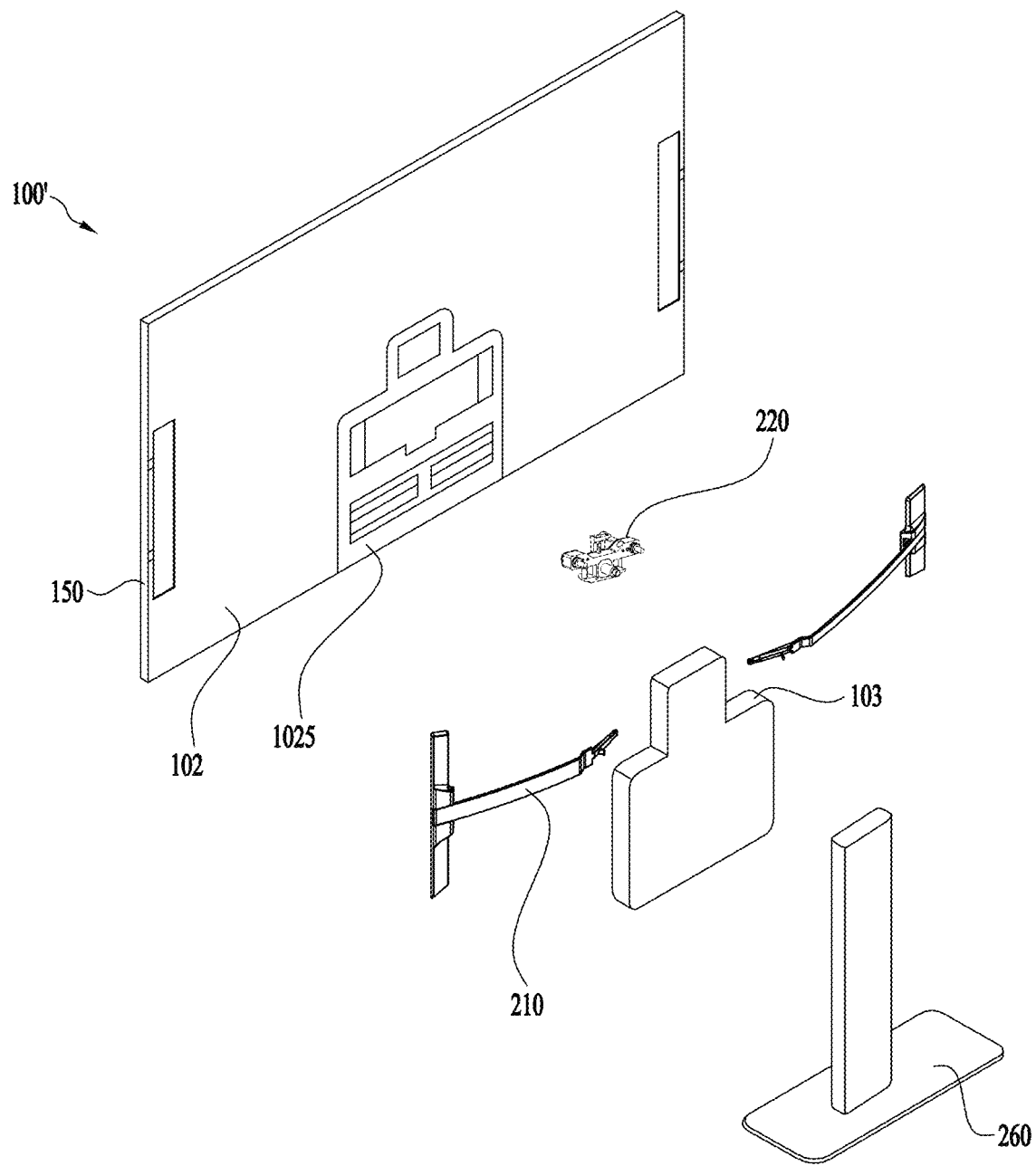
FIG. 4 is an exploded perspective view illustrating a display device according to an embodiment of the present disclosure.

FIG. 3 is a rear view illustrating the display device 100 according to an embodiment of the present disclosure. FIG. 4 is an exploded perspective view illustrating the display device 100 according to an embodiment of the present disclosure. Referring to FIGS. 3 and 4, the display device 100 may include a main body 100', a stand 260 for mounting the main body 100' on the floor, a controller 180, and curvature adjustment units 210, 220, and 230.

The main body 100' including the display module 150 may include a cover bottom 102 that covers a back surface of the display module 150 to which an image is output. A heat dissipation structure for discharging heat generated by the display module 150 may be provided at the inner surface of the cover bottom 102, and the main body 100' may further include a reinforcing material for reinforcing rigidity.

The cover bottom 102 may cover the back surface of the display module 150, may reinforce the rigidity of the display module 150, and may protect the back surface of the display module 150. In particular, the display module 150 may cover a driving IC of the display extending in a backward direction of the display module 150. A main substrate may be mounted on the back surface of the cover bottom 102 as a controller for controlling the display module 150, and a hole may be formed in the cover bottom 102 to interconnect the main substrate and the driving IC of the display module 150.

A separate bracket 1025 may be further provided so that the controller 180, such as a main board, can be mounted thereto. The display device 100 according to the present disclosure may further include a curvature adjustment unit for changing the curvature of the main body 100' other than the controller for controlling the display module 150 on the back surface of the cover bottom 102.

The curvature adjustment unit may further include a pair of links 210, a bending module 220 located at the center of the display device 100 and coupled to one end of the pair of links 210, and a pair of link brackets 230 disposed between the other end of the pair of links 210 and the cover bottom 102.

Figure 5:
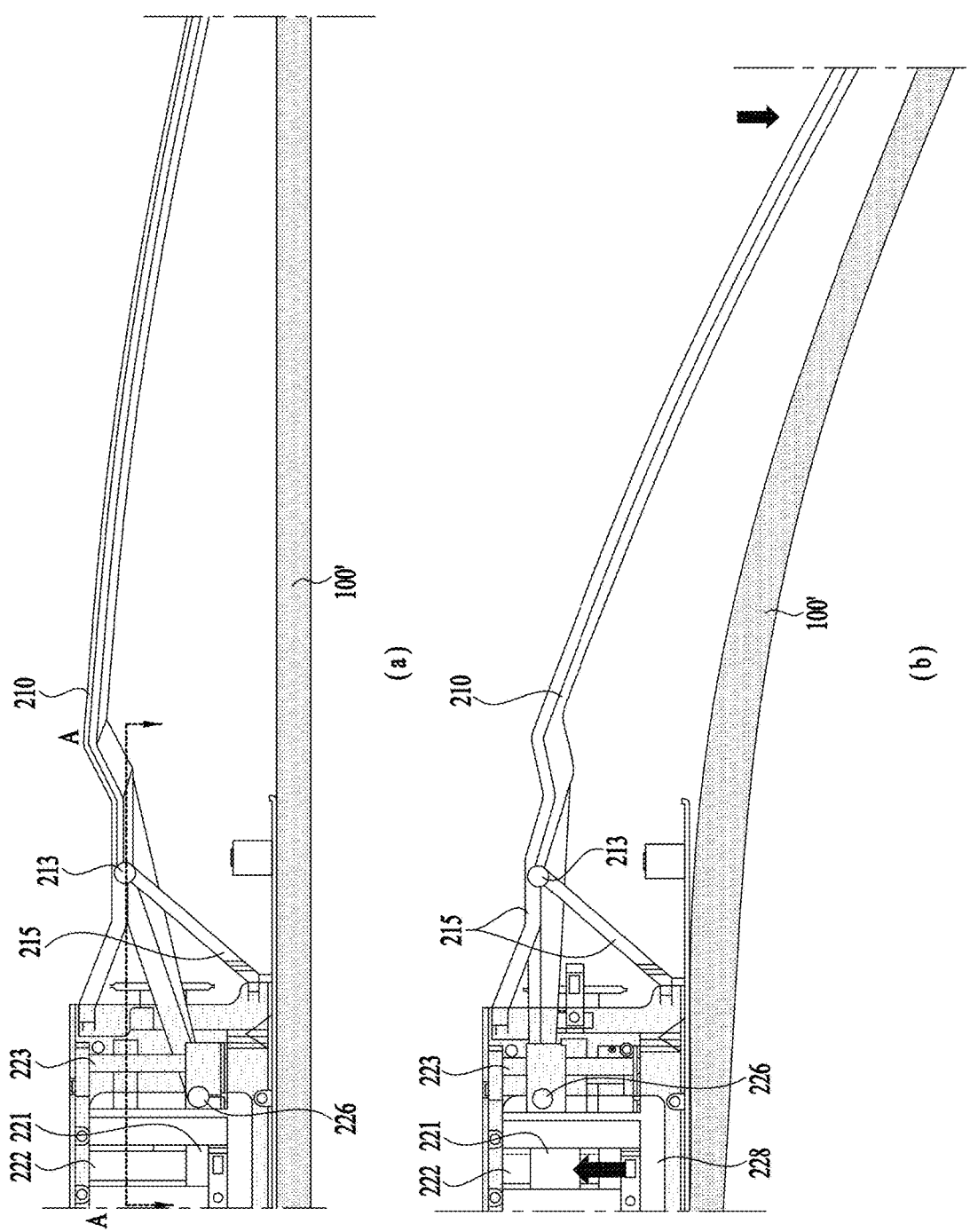
FIG. 5 is a top view illustrating a display device according to an embodiment of the present disclosure.

FIG. 5 is a top view illustrating the display device 100 according to an embodiment of the present disclosure. As shown in FIGS. 5(a) and 5(b), the curvature of the display device 100 may be changed according to the angle formed by the pair of links 210. The angle of the pair of links 210 may be adjusted according to a change in the position of the moving block 221 of the bending module 220.

The other end of the pair of links 210 may be slidably coupled to the link bracket 230. When the link bracket 230 is fixed to the link bracket 230, the curvature of the display module 150 is large at the end thereof so that it is difficult to implement a natural curved surface of the display module 150.

Accordingly, if the angle of the pair of links 210 is adjusted by the bending module 220, the other end of the link 210 slidably moves on the link bracket 230, so that a natural curved surface of the display module 150 can be implemented.

The bending module 220 may include a moving block 221 connected to one end of the link 210 and movable forward and backward, a guide shaft 222 for guiding the moving block 221 to move forward and backward without moving in the horizontal direction, and a module bracket 228 for receiving the bending module 220.

The link 210 is rotatably coupled to the link fixing unit 215 extending from the bending module 220. The link 210 may rotate around the link fixing pin 213 fastened to the link fixing unit 215, and one end and the other end of the link 210 may move in opposite directions.

When the user pulls the horizontal ends SS1 and SS2 of the main body 100' in a forward direction, the bending module 220 may allow the other end of the link 210 located on the horizontal ends SS1 and SS2 of the main body 100' to move in a forward direction, the link 210 may rotate around the link fixing pin 213, and one end of the link 210 may move in a backward direction.

In contrast, when the user pushes the horizontal ends SS1 and SS2 of the main body 100' in a backward direction so as to use the display device as a flat display, the other end of the link 210 may move backward and one end of the link 210 may move forward. A coupling position of the link fixing pin 213 may be located closer to one end of the link 210 than the other end of the link 210, and the movement distance of one end of the link 210 may be shorter than the movement distance of the other end of the link 210.

As described above, the user may manually change the curvature of the display device 100 by applying force to the horizontal ends SS1 and SS2 of the main body 100. At this time, the pair of links 210 is synchronized with the bending module 220 and simultaneously moved. As a result, the other side SS2 can also move at the same time when the user pulls or presses one side SS1 of the main body 100'.

However, according to the manual driving method, the user may apply force directly to the display module 150, there is a high risk of damage to the display module 150, and a motor is provided in the bending module 220, so that the curvature of the display module 150 can be changed.

For example, the guide shaft 222 may be formed in a spiral shape, and a spiral groove corresponding to the spiral of the guide shaft 222 may be formed in the moving block 221. When the motor rotates the guide shaft 222, the moving block 221 may move forward and backward.

When the moving block 221 of the bending module 220 moves backward, one end of the link 210 coupled to the moving block 221 moves backward, the other end of the link 210 moves forward, and the angle of the pair of links 210 may vary. The bending module 220 may induce a change in the angle of the links 210, and the display module 150 may again transition to the bent state or the flat state.

The display device 100 may further include a back cover 103 for covering the bending module 220 and the controller, and may further include a stand 260 for holding the main body 100' of the display device 100 on the floor. Instead of the stand 260, the display device 100 may further include a wall bracket that can be installed on the wall, and the stand 260 and the wall bracket may be coupled to the back cover 103.

In addition, the moving block 221 according to the present embodiment may move forward and backward along the guide shaft 222 protruding from the back surface of the main body 100'. One end of the link 210 may be coupled to the moving block 221, and may be rotatably coupled to the moving block 221 through the operation pin 226 to change the angle thereof according to movement of the moving block 221.

Hereinafter, specific embodiments of the display device described above will be described with reference to FIGS. 1 to 5. However, in FIGS. 1 to 5, the display device (hereinafter referred to as a bendable display device) capable of changing the curvature thereof has been mainly described for convenience of description, the scope or spirit of the present disclosure is not limited thereto, and the following description will be given centering upon an embodiment capable of being implemented in the display device including the bendable display device.

Figure 6:
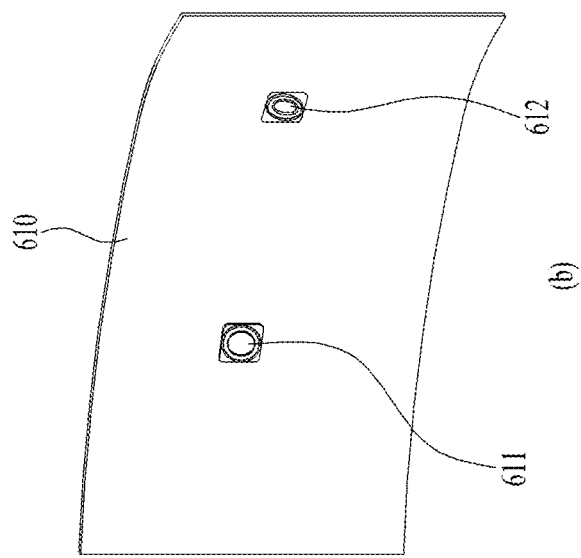
FIG. 6 shows a flat state and a curved state of a bendable display device according to an embodiment of the present disclosure in comparison.
Figure 6:
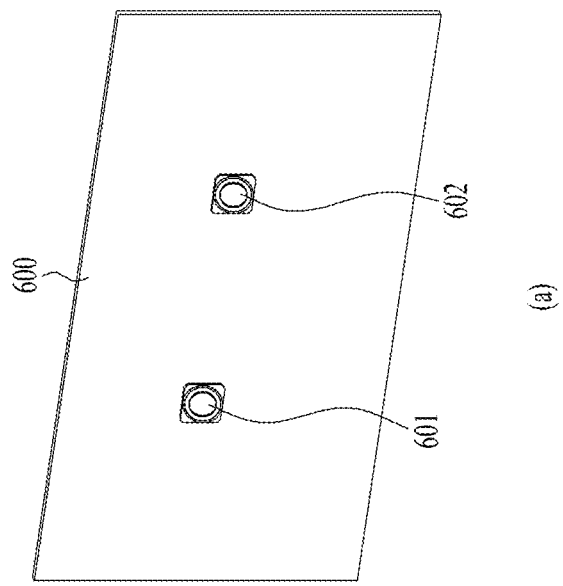

FIG. 6 shows a flat state and a curved state of a bendable display device according to an embodiment of the present disclosure in comparison.

(a) in FIG. 6 shows a case in which a bendable display device 600 is in a flat state. In addition, the display device 600 according to an embodiment of the present disclosure is designed to output the audio via the screen by adding one or more piezoelectric sensors 601 and 602 or the like to the screen instead of the separate speaker.

On the other hand, (b) in FIG. 6 shows that a bendable display device 610 is in a curved state. However, in this case, directions of piezoelectric sensors 611 and 612 that output the audio via the screen are also changed, so that the same audio is perceived differently by the user.

Depending on a curvature of the screen, a balance of audio data changes due to sound reflection and intensity and the like. This will be described in more detail below with reference to FIG. 7.

Figure 7:
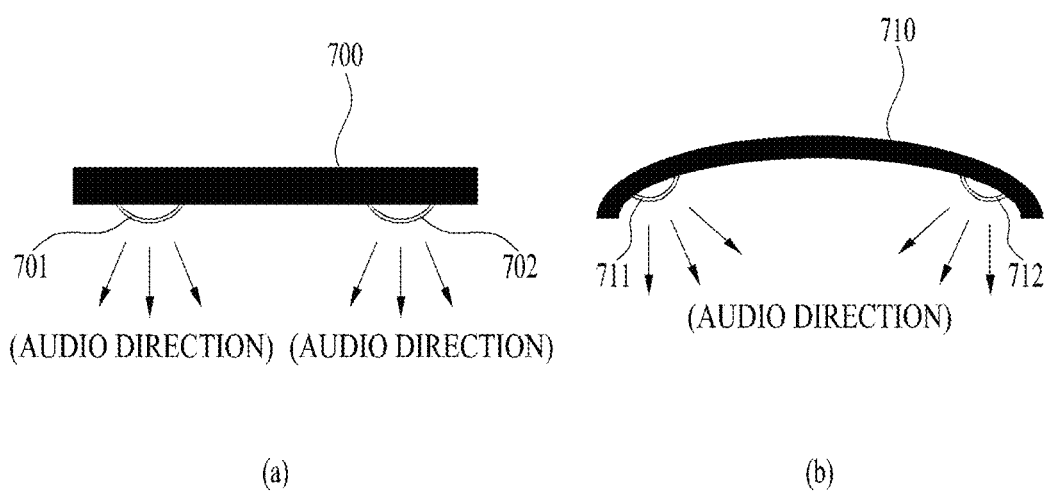
FIG. 7 is a diagram showing directions in which a bendable display device according to an embodiment of the present disclosure outputs audio via a screen in a flat state and a curved state in comparison.

FIG. 7 is a diagram showing directions in which a bendable display device according to an embodiment of the present disclosure outputs audio via a screen in a flat state and a curved state in comparison.

As shown in (a) in FIG. 7, in the flat state, in a bendable display device 700, piezoelectric sensors 701 and 702 attached to a screen may diffuse sound in left and right directions.

However, as shown in (b) in FIG. 7, in the curved state, in a bendable display device 710, directions of piezoelectric sensors 711 and 712 attached to a screen are changed, so that sounds are collected and overlapped. In particular, it has been experimentally identified that there is a problem in that acoustic characteristics are physically changed, such as a sound pressure is amplified in a specific frequency band. This will be described later in more detail with reference to FIG. 8.

Figure 8:
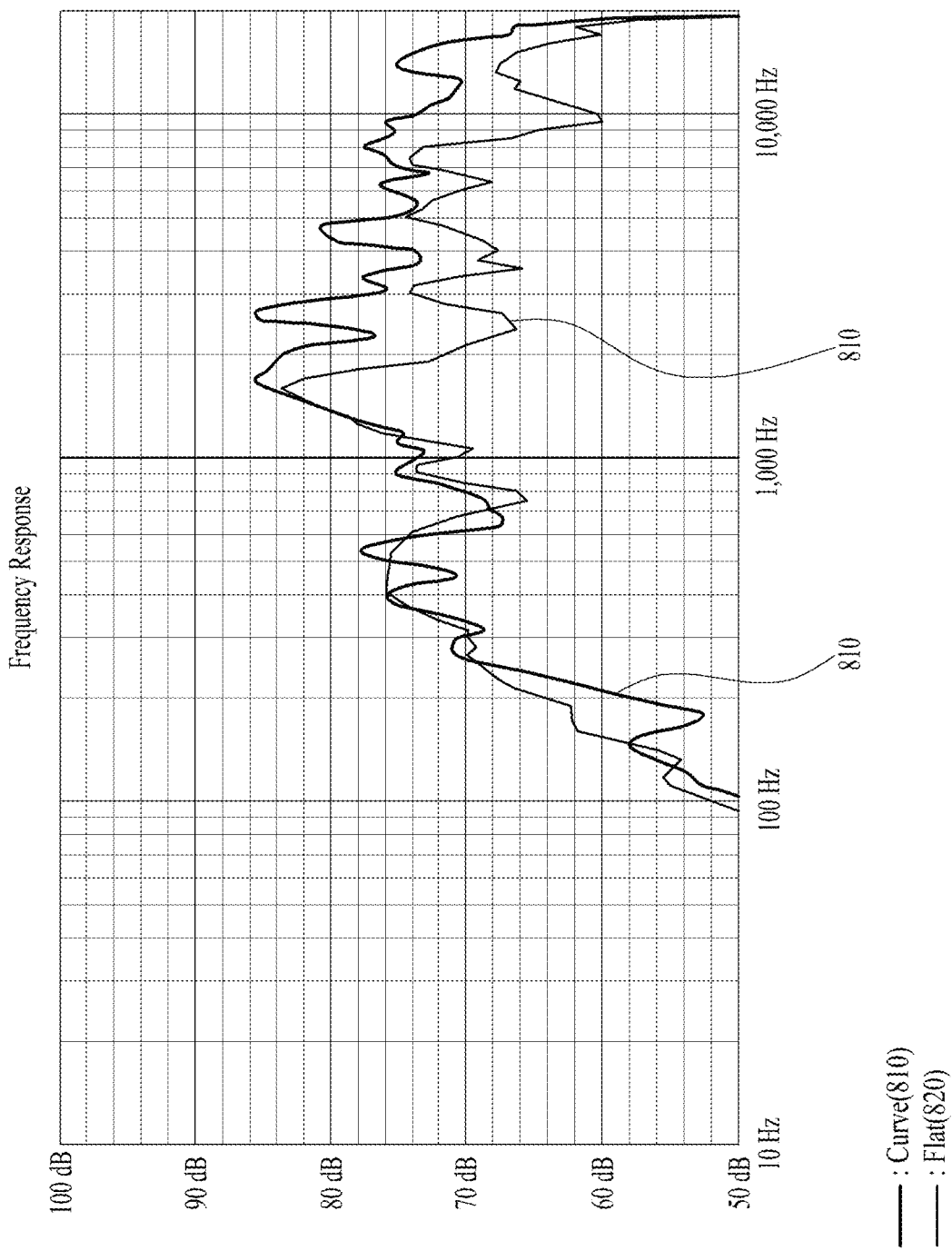
FIG. 8 shows a graph indicating experimentally obtained characteristics of audio output in a flat state and a curved state.

FIG. 8 shows a graph indicating experimentally obtained characteristics of audio output in a flat state and a curved state.

As shown in FIG. 8, it may be seen that an audio characteristic 810 of the curved state and an audio characteristic 820 of the flat state are almost similar to each other in a low frequency band and a high frequency band.

However, in a specific intermediate frequency band (e.g., from 2 kHz to 10 kHz shown in FIG. 8), there is a significant gap between the audio characteristic 810 of the curved state and the audio characteristic 820 of the flat state.

Therefore, a consistent audio experience is not able to be provided to users who use the bendable display device (particularly, a product that outputs the audio via the screen), and there is a possibility that the user may misperceive that the corresponding bendable TV is broken.

On the other hand, one embodiment of the present disclosure is to provide a technology that may provide the same level of audio to the user without an acoustic change when the state of the bendable display device is switched between the flat state and the curved state.

Basically, the flat state and the curved state are designed to reflect different EQ values in consideration of the occurrence of the difference in the direction of the speaker added to the screen as described above.

However, in the flat state, because a curvature radius R converges to infinity, an amount of computation increases. A solution for solving such problem will be described later with reference to FIG. 9.

Figure 9:
FIG. 9 is a diagram for illustrating a process of calculating B based on a screen curvature radius R and size information A of the screen.

FIG. 9 is a diagram for illustrating a process of calculating B based on a screen curvature radius R and size information A of the screen.

As shown in FIG. 9, A means size information when the screen is in the flat state, and more specifically, means half of a horizontal length of the screen in the flat state. Therefore, in the flat state, a value of B becomes 0.

On the other hand, in the curved state, as shown in FIG. 9, when A means the half of the horizontal length of the screen in the flat state, the value of B is obtained as a constant in the relationship with the curvature radius R.

Therefore, when an acoustic balance is adjusted based on a ratio of a value of B' for each curved state and the value of B on the basis of the value B in the most curved state obtained in FIG. 9, the user may hear the sound with the same volume balance in any state. More specific experimental data will be described later with reference to FIG. 10.

Figure 10:
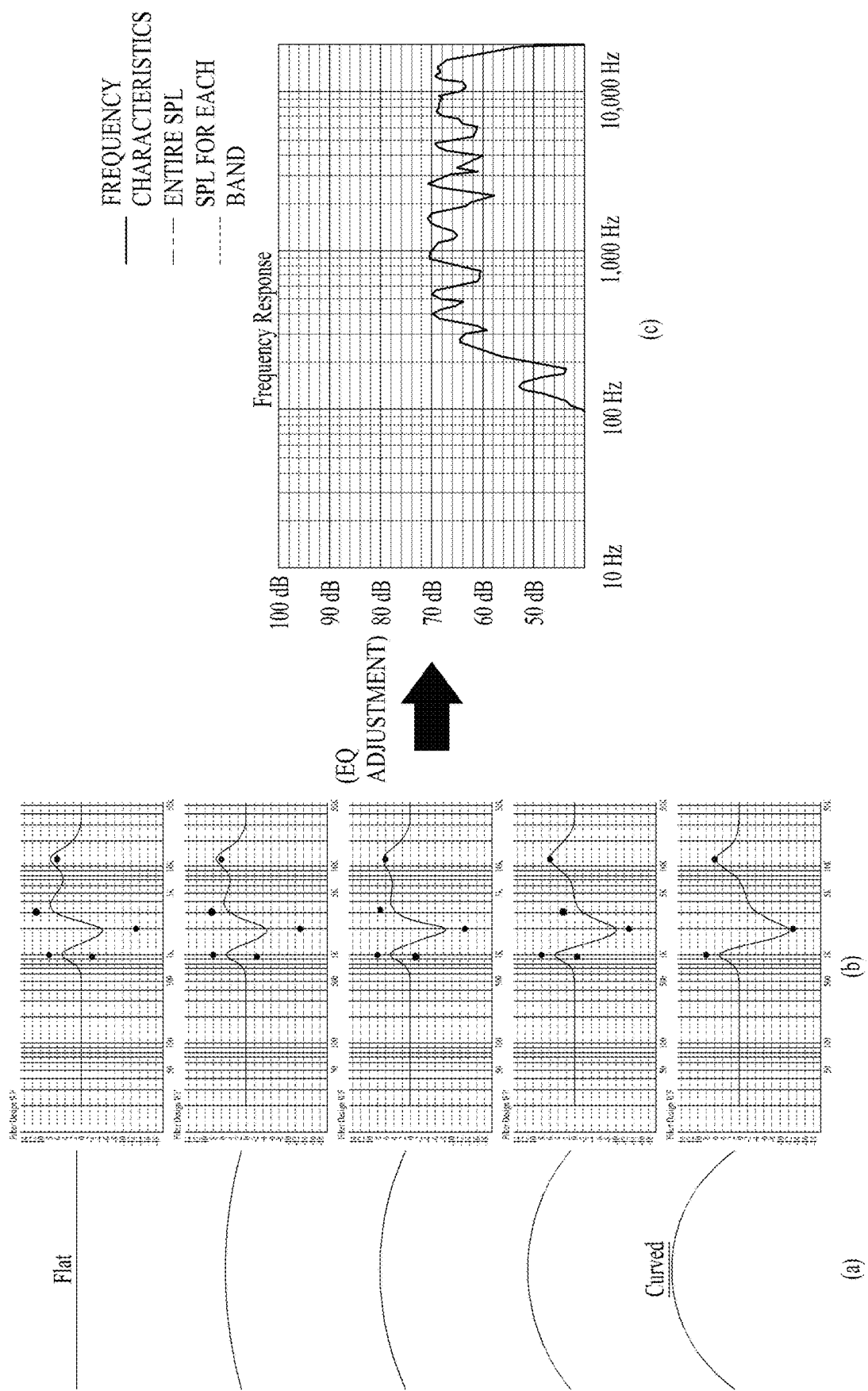
FIG. 10 shows a result obtained with the same audio characteristics regardless of a degree of bending of a bendable display device.

FIG. 10 shows a result obtained with the same audio characteristics regardless of a degree of bending of a bendable display device.

As shown in (a) in FIG. 10, the bendable display device according to one embodiment of the present disclosure may have various degrees of bending.

(b) in FIG. 10 shows an amount of change in decibels (dB) for each frequency of audio data, corresponding to (a) in FIG. 10. In addition, irrespective of the degree of bending of the bendable display device, (c) in FIG. 10 shows a result with the same acoustic characteristics output after applying an EQ.

For example, the bottom of (a) in FIG. 10 means the most curved state of the screen of the bendable display device. As described above in FIG. 9, based on the curvature radius R and the size information A of the screen, the value of B, which is the degree to which the screen is forwardly protruded, is obtained, and the corresponding EQ value is stored in the memory.

Furthermore, the value of B' for each of the various degrees of bending shown in (a) in FIG. 10 is obtained, and the EQ value stored in the memory is adjusted based on the ratio of the value of B' with the value of B in the most curved state.

More specifically, for example, when the ratio of the value of B and the value of B' is within a range from 0 to 1, an EQ value corresponding to B' is adaptively determined between an EQ value (c) of when B is the maximum value and an EQ value (d) of when B is the minimum value of 0.

When the design is made as such, there is an advantage in that it is not necessary to individually store the EQ values in the memory based on all of the degrees of bending.

Figure 11:
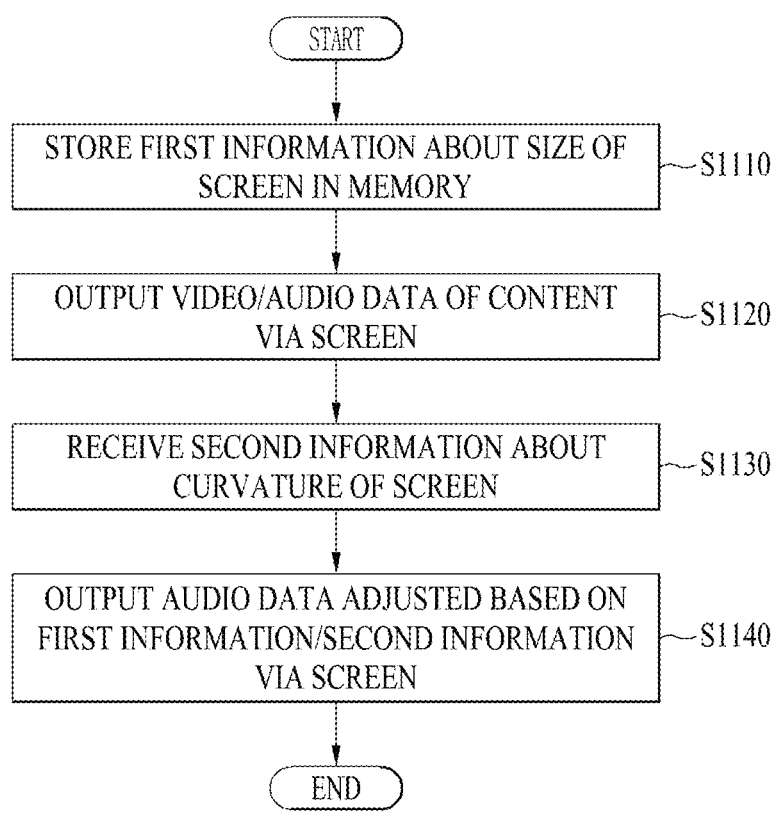
FIG. 11 is a flowchart illustrating a method for controlling a bendable display device according to an embodiment of the present disclosure.

FIG. 11 is a flowchart illustrating a method for controlling a bendable display device according to an embodiment of the present disclosure. Referring to the previous drawings, those skilled in the art may supplementarily interpret FIG. 11.

The bendable display device according to one embodiment of the present disclosure stores first information about the size of the screen of the bendable display device in the memory (S1110). In this regard, the first information about the size of the screen may correspond to, for example, the half of the horizontal length of the screen in the state in which the screen is flat, and may correspond to A shown in FIG. 9.

Furthermore, the bendable display device outputs video data and audio data of the content via the screen (S1120).

In addition, the bendable display device is designed to receive second information about the curvature of the screen (S1130). In this regard, the second information about the curvature of the screen corresponds to, for example, the curvature radius of the screen.

In addition, the bendable display device outputs the audio data adjusted based on the first information and the second information via the screen (S1140).

In particular, the bendable display device is designed to adjust audio data in a specific frequency band corresponding to, for example, a range from 2 kHz to 10 kHz. An embodiment related thereto has been previously described in FIG. 8.

On the other hand, the method invention shown in FIG. 11 may also be implemented as a product invention with reference to FIG. 1.

For example, the storage 140 stores the first information about the size of the screen of the bendable display device.

The display module 150 outputs the video data and the audio data of the content. In this regard, a supplementary interpretation may be made with reference to the previous FIG. 6.

A controller 180 receives the second information about the curvature of the screen (the display module 150), and controls the audio data adjusted based on the first information and the second information to be output via the screen (the display module 150).

In Previous FIGS. 6 to 11, the embodiments in which the bendable display device realizes the same audio effect in the flat state, in the slightly curved state, and in the fully curved state have been described.

On the other hand, in FIG. 12 and below, another embodiment of intentionally giving different acoustic effects based on a type of content currently being output and a degree of bending of a bendable screen will be described.

Figure 12:
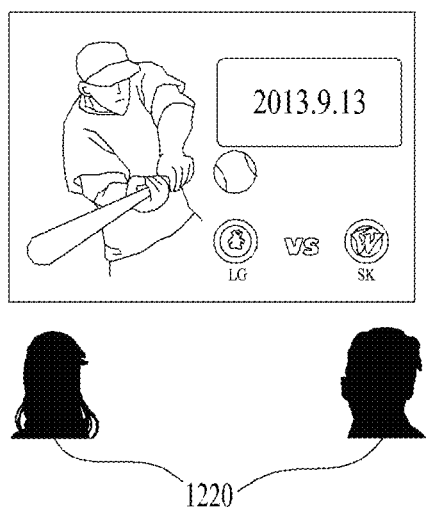
FIG. 12 shows a case in which a bendable display device according to an embodiment of the present disclosure outputs content of a first type in a flat state.
Figure 12:
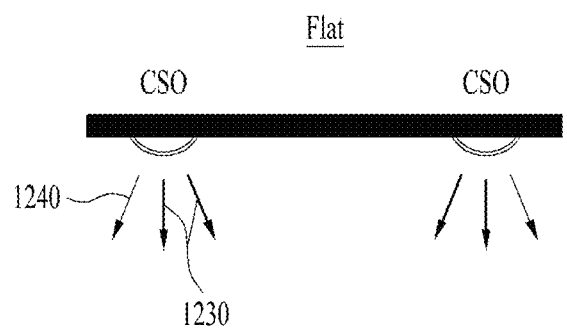

FIG. 12 shows a case in which a bendable display device according to an embodiment of the present disclosure outputs content of a first type in a flat state.

It is assumed that the bendable display device outputs content 1210 of a first type as shown in (a) in FIG. 12. Furthermore, it is additionally assumed that the bendable display device is in the flat state as shown in (b) in FIG. 12.

In the flat screen, when a plurality of users 1220 watch the content or content (e.g., a sports game or the like) suitable for the sound to spread is executed, the design is made such that a characteristic of a specific frequency band of existing audio data 1230 is adjusted and/or virtual surround 1240 is additionally created together. In this case, the specific frequency band requiring the adjustment will be described later in more detail with reference to (a) in FIG. 14.

Figure 13:
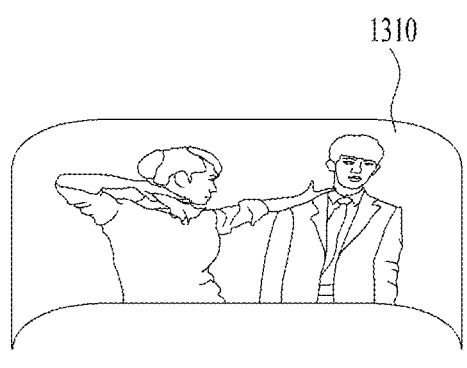
FIG. 13 shows a case in which a bendable display device according to an embodiment of the present disclosure outputs content of a second type in a curved state.
Figure 13:
Figure 13:
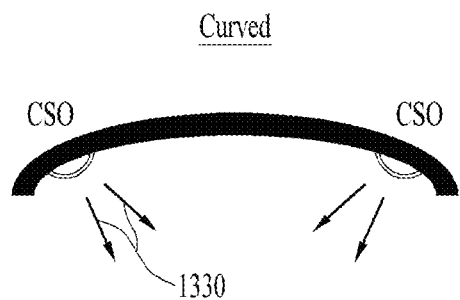

FIG. 13 shows a case in which a bendable display device according to an embodiment of the present disclosure outputs content of a second type in a curved state. Unlike FIG. 12, it is assumed in FIG. 13 that content of a different type is output and the bendable display device is in a different curved state.

For example, it is assumed that the bendable display device outputs content 1310 of the second type as shown in (a) in FIG. 13. Furthermore, it is additionally assumed that the bendable display device is in the curved state as shown in (b) in FIG. 13.

In the curved screen, when one user 1320 watches the content or content (e.g., first-person game or the like) with high immersion and tension is executed, the design is made such that a characteristic of a specific frequency band of existing audio data 1330 is adjusted. In this case, the specific frequency band requiring the adjustment will be described later in more detail with reference to (b) in FIG. 14.

Figure 14:
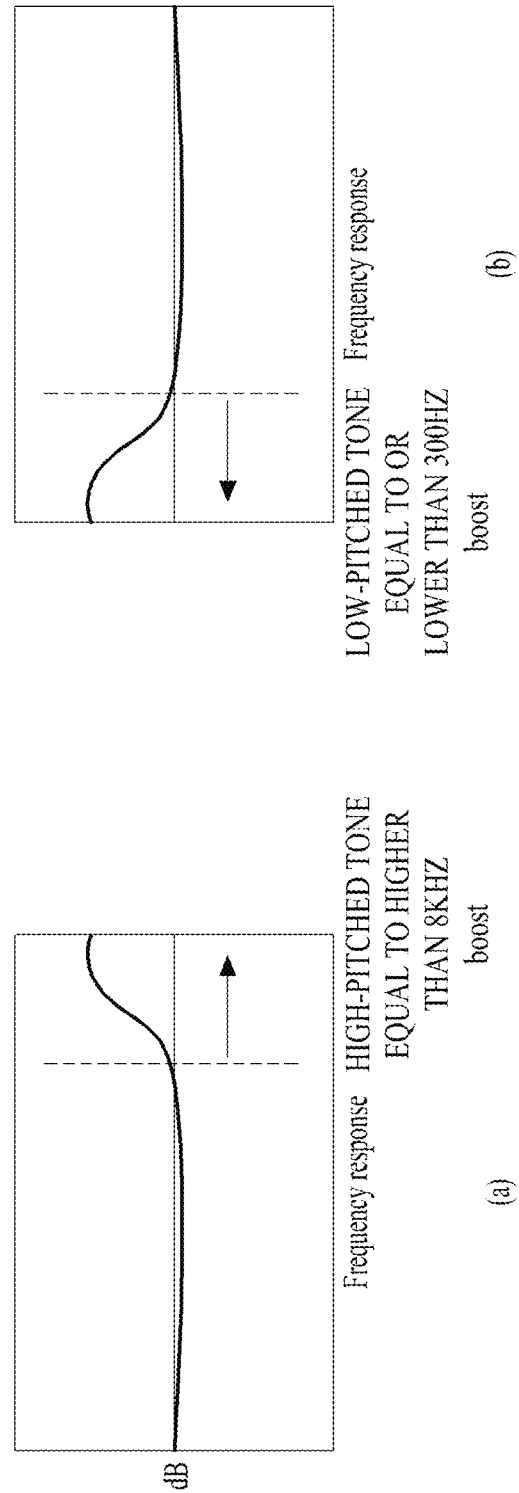
FIG. 14 is a diagram for illustrating a process of adjusting decibels (dB) of a specific frequency band in each situation of FIGS. 12 and 13.

FIG. 14 is a diagram for illustrating a process of adjusting decibels (dB) of a specific frequency band in each situation of FIGS. 12 and 13.

In the situation shown in FIG. 12, that is, in the situation in which the content of the first type is output and the bendable display device is in the flat state, as shown in (a)

in FIG. 14, the EQ is adjusted such that a high-pitched frequency band (e.g., 8 kHz or higher) of the audio data is emphasized.

On the other hand, in the situation shown in FIG. 13, that is, in the situation in which the content of the second type is output and the bendable display device is in the curved state, as shown in (b) in FIG. 14, the EQ is adjusted such that a low-pitched frequency band (e.g., 300 Hz or lower) of the audio data is emphasized.

In one example, even when the value of B' calculated with reference to FIG. 9 is less than half of the value of B in the fully curved state, as in (a) in FIG. 14, the EQ is adjusted such that the high-pitched frequency band (e.g., 8 kHz or higher) of the audio data is emphasized.

On the other hand, when the value of B' calculated with reference to FIG. 9 is equal to or more than the half of the value of B in the fully curved state, as in (b) in FIG. 14, the EQ is adjusted such that the low-pitched frequency band (e.g., 300 Hz or lower) of the audio data is emphasized.

Figure 15:
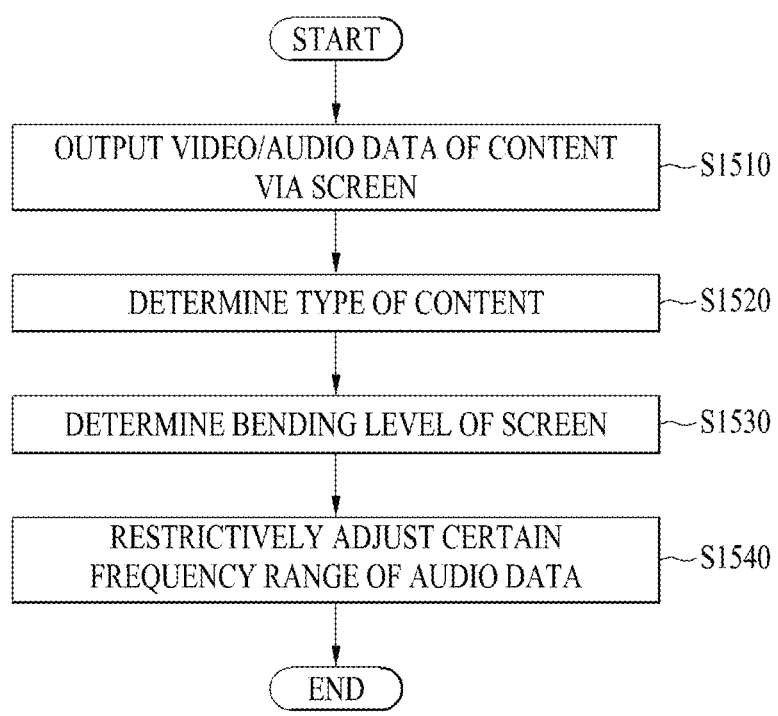
FIG. 15 is a flowchart showing a method for controlling a bendable display device according to another embodiment of the present disclosure.

In addition, FIG. 15 is a flowchart showing a method for controlling a bendable display device according to another embodiment of the present disclosure.

The bendable display device according to another embodiment of the present disclosure outputs the video data and the audio data of the content via the screen of the bendable display device (S1510).

The bendable display device determines the type of the content (S1520), and determines a bending level of the screen (S1530).

In addition, the bendable display device is designed to restrictively adjust the certain frequency range of the audio data based on the determined content type and bending level (S1540).

When the content corresponds to the first type and the bending level of the screen corresponds to a first range, the bendable display device increases the decibels (dB) of the frequency range equal to or higher than 8 kHz of the audio data (see (a) in FIG. 14).

Further, when the content corresponds to the first type and the bending level of the screen corresponds to the first range, the bendable display device creates virtual surround and additionally outputs the created virtual surround via the screen (1240 shown in (b) in FIG. 12).

On the other hand, when the content corresponds to the second type and the bending level of the screen corresponds to a second range, the bendable display device increases decibels (dB) of the frequency range equal to or lower than 300 Hz of the audio data (see (b) in FIG. 14).

As shown in FIGS. 12 and 13, the first type includes a two-player game, and the second type includes the first-person game.

In addition, the first range includes the flat state of the screen, and the second range includes the curved state of the screen.

In one example, the method invention shown in FIG. 15 may also be realized as the product invention with reference to previous FIG. 2.

For example, the display module 150 of the bendable display device outputs the video data and the audio data of the content. This is previously described with reference to FIG. 6, so that repeated implementations are possible by those skilled in the art even when the duplicated description is omitted.

The controller 180 determines the type of the content, and determines the bending level of the screen.

Finally, the controller 180 restrictively adjusts the certain frequency range of the audio data based on the determined content type and bending level. The specific embodiment related thereto has been described in detail with reference to FIGS. 12 to 14 previously, and thus, duplicated description will be omitted.

The present disclosure may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

MODE

Various embodiments of the present disclosure have been described in the previous "DESCRIPTION OF SPECIFIC EMBODIMENTS," and it is also within the scope of the present disclosure that those skilled in the art combine the embodiments described in two or more drawings with each other as needed.

INDUSTRIAL APPLICABILITY

Because the present disclosure is applicable to the display devices of various form factors, for example, the bendable display device, industrial applicability is acknowledged.

What is claimed is:

1. A method for controlling a bendable display device, the method performed by a bendable display device and comprising:
   outputting video data and audio data of content via a screen of the bendable display device, wherein the outputting of the audio data includes:
   determining a type of the content;
   determining a bending level of the screen; and
   adjusting a certain frequency range of the audio data based on the content type and the bending level.

2. The method of claim 1, further comprising:
   based on the content corresponding to a first type and the bending level of the screen corresponding to a first range,
   increasing decibels (dB) of a frequency range equal to or higher than 8 kHz of the audio data.

3. The method of claim 1, further comprising:
   based on the content corresponding to the first type and the bending level of the screen corresponding to the first range,
   creating virtual surround; and
   additionally outputting the created virtual surround via the screen.

4. The method of claim 1, further comprising:
   based on the content corresponding to a second type and the bending level of the screen corresponding to a second range,
   increasing decibels (dB) of a frequency range equal to or lower than 300 Hz of the audio data.

5. The method of claim 4, wherein the first type includes a two-player game and the second type includes a first-person game,
wherein the first range includes a flat state of the screen,
wherein the second range includes a curved state of the screen.

6. A bendable display device comprising:
a screen for outputting video data and audio data of content; and
a controller configured to determine a type of the content, wherein the controller is configured to:
determine a bending level of the screen; and
adjust a certain frequency range of the output audio data based on the determined content type and the determined bending level.

7. The bendable display device of claim 6, wherein based on the content corresponding to a first type and the bending level of the screen corresponding to a first range, the controller is configured to increase decibels (dB) of a frequency range equal to or higher than 8 kHz of the audio data.

8. The bendable display device of claim 6, wherein based on the content corresponding to the first type and the bending level of the screen corresponding to the first range, the controller is configured to:
create a virtual surround; and
additionally output the created virtual surround via the screen.

9. The bendable display device of claim 6, wherein based on the content corresponding to a second type and the bending level of the screen corresponding to a second range, the controller is configured to increase decibels (dB) of a frequency range equal to or lower than 300 Hz of the audio data.

10. The bendable display device of claim 6, wherein the first type includes a two-player game and the second type includes a first-person game,
wherein the first range includes a flat state of the screen,
wherein the second range includes a curved state of the screen.

* * * * *